(12) United States Patent
Tanioka

(10) Patent No.: US 9,077,228 B2
(45) Date of Patent: Jul. 7, 2015

(54) ROTARY ACTUATOR EQUIPPED WITH SENSING MECHANISM, AND JOINT UNIT

(75) Inventor: Nozomu Tanioka, Azumino (JP)

(73) Assignee: HARMONIC DRIVE SYSTEMS INC., Shinagawa-Ku, Tokyo (JP)

(*) Notice: Subject to any disclaimer, the term of this patent is extended or adjusted under 35 U.S.C. 154(b) by 381 days.

(21) Appl. No.: 13/816,138

(22) PCT Filed: Sep. 28, 2010

(86) PCT No.: PCT/JP2010/005834
§ 371 (c)(1),
(2), (4) Date: Feb. 8, 2013

(87) PCT Pub. No.: WO2012/042562
PCT Pub. Date: Apr. 5, 2012

(65) Prior Publication Data
US 2013/0139636 A1    Jun. 6, 2013

(51) Int. Cl.
*B25J 17/00* (2006.01)
*H02K 11/00* (2006.01)
*B25J 17/02* (2006.01)
*H02K 7/116* (2006.01)
*H02K 7/14* (2006.01)

(52) U.S. Cl.
CPC ....... *H02K 11/0026* (2013.01); *Y10T 74/20329* (2015.01); *B25J 17/0241* (2013.01); *H02K 7/116* (2013.01); *B25J 17/00* (2013.01); *H02K 11/0015* (2013.01); *B25J 17/025* (2013.01); *H02K 7/14* (2013.01)

(58) Field of Classification Search
CPC .. B25J 17/0241; B25J 17/00; H02K 11/0015; H02K 11/0026
See application file for complete search history.

(56) References Cited

U.S. PATENT DOCUMENTS 5,106,258 A * 4/1992 Orii ............................. 414/733
5,222,409 A * 6/1993 Dalakian ................... 74/479.01

(Continued)

FOREIGN PATENT DOCUMENTS

JP    7-042215 Y2    9/1995
JP    8-254439 A    10/1996

(Continued)

OTHER PUBLICATIONS

International Search Report (PCT/ISA/210) issued on Jan. 11, 2011, by the Japanese Patent Office as the International Searching Authority for International Application No. PCT/JP2010/005834.

*Primary Examiner* — David M Fenstermacher
(74) *Attorney, Agent, or Firm* — Buchanan Ingersoll & Rooney PC

(57) ABSTRACT

A rotary actuator equipped with a sensing mechanism includes a motor and a reducer concentrically disposed inside a cylindrical housing; a scale for detecting the rotational position of a rotary arm, the scale being disposed on the circular outer face of the cylindrical housing; and a position sensor mounted in the facing section of the rotary arm that rotates along the circular outer face, the facing section being in a facing arrangement with the circular outer face. A detection mechanism includes the scale and the position sensor detects the rotational position of the rotary arm capable of rotating within a finite angular range along the circular outer face of the cylindrical housing. The components are concentrically disposed. The actuator is suitable for use as a digital joint unit.

17 Claims, 3 Drawing Sheets

(56) References Cited

U.S. PATENT DOCUMENTS

| | | |
|---|---|---|
| 5,872,892 A | 2/1999 | Brown et al. |
| 6,729,201 B2 * | 5/2004 | Mori et al. ............ 74/490.01 |
| 8,141,924 B2 * | 3/2012 | Albin ...................... 294/106 |
| 8,176,808 B2 * | 5/2012 | Fisk et al. ............. 74/490.05 |
| 8,414,043 B2 * | 4/2013 | Albin et al. ............. 294/106 |
| 8,425,403 B2 * | 4/2013 | Jo et al. ................. 600/102 |
| 8,460,175 B2 * | 6/2013 | Jo et al. ................. 600/102 |
| 8,602,134 B2 * | 12/2013 | Andrus et al. ........ 180/9.48 |

FOREIGN PATENT DOCUMENTS

| | | |
|---|---|---|
| JP | 10-315168 A | 12/1998 |
| JP | 2001-191290 A | 7/2001 |
| JP | 2001-341092 A | 12/2001 |
| JP | 2004-122339 A | 4/2004 |
| JP | 2006-141101 A | 6/2006 |

* cited by examiner (a)

(b)

ROTARY ACTUATOR EQUIPPED WITH SENSING MECHANISM, AND JOINT UNIT

TECHNICAL FIELD

The present invention relates to a rotary actuator provided with a rotary arm capable of rotating within a finite angular range along the circular outer face of a cylindrical housing, and relates to a small-sized, compactly configured rotary actuator provided with a sensing mechanism for detecting the rotational position of the rotary arm.

BACKGROUND ART

In the wrist, elbow, and other joints of robot arms, as well as in the finger joints of robot hands and the like, actuators are installed for causing a member attached to a shaft in these joints to revolve or rotate within a finite angular range. An actuator configured so that a motor and a reducer are connected concentrically and in series, and that a joint shaft disposed concentrically with the central axis of the motor and reducer rotates around the central axis line, is known as such an actuator, as disclosed in Document 1. Also known is an actuator configured so that a joint shaft perpendicular to the motor shaft is rotated by the output rotation of the motor via a reduction gear mechanism comprising a pair of bevel gears, as disclosed in Document 2.

A sensing mechanism configured so that a reflective plate formed on the outer face of the output shaft of a reducer is detected by a reflecting photosensor disposed outside of the reflective plate is known as a sensing mechanism for detecting the rotational position and the revolving position of a joint shaft, as disclosed in Patent Document 1. A sensing mechanism configured so that a scale is formed on the outer face of a cylindrical rotor attached concentrically to the rotation axis, and that the scale is detected by a reflecting photosensor disposed on the outer side of the scale is also known, as disclosed in Document 3.

PRIOR ART DOCUMENTS

Patent Documents

[Patent Document 1] JP-A 2006-141101
[Patent Document 2] JP-A 2004-122339
[Patent Document 3] JP-A 08-254439

DISCLOSURE OF THE INVENTION

Problems the Invention is Intended to Solve

The actuator in which the joint shaft is rotated around the motor axis as disclosed in Patent Document 1 has a considerable axial length because of the configuration in which the motor and the reducer are connected in series. Therefore, the actuator is not always appropriate to use in the joint of a finger unit in an axially short robot hand. Furthermore, in cases such as that disclosed in Patent Document 3, where the sensing mechanism for detecting the revolving position of the actuator is an optical rotary encoder attached to the motor shaft, to the joint shaft, or the like, the axial length is even greater, making the actuator unsuitable for making a joint part smaller in size and more compact.

In the light of the abovementioned problems, it is an object of the present invention to provide a small-sized, compactly configured rotary actuator appropriate for use as a finger-joint unit, the actuator being provided with a sensing mechanism for detecting the rotational position of a rotary arm capable of rotating within a finite angular range along the circular outer face of a cylindrical housing.

Means for Solving the Problems

In order to solve the above-mentioned problems, the rotary actuator of the present invention is characterized in having:
a cylindrical housing;
a fixed spindle and a revolving output shaft projecting concentrically outward from both end surfaces of the cylindrical housing;
a rotary arm provided with a facing section that spans the space between the fixed spindle and the revolving output shaft and is positioned facing the circular outer face of the cylindrical housing, the arm being capable of rotating within a finite angular range on the circular outer face;
a scale formed along the circular outer direction on the circular outer face in order to detect the rotational position of the rotary arm;
a position sensor mounted on the facing section of the rotary arm in order to read the scale;
a motor installed concentrically in the cylindrical housing; and
a reducer installed concentrically on the inner side of the motor in the cylindrical housing in order to reduce the speed of the output revolution of the motor and to output the revolution to the revolving output shaft;
wherein one end of the rotary arm is rotatably supported by the fixed spindle, and the other end is linked to the revolving output shaft.

Here, the scale may comprise light-reflecting surfaces formed at a designated interval in the peripheral direction, and the position sensor may be a reflecting photosensor provided with a light-emitting element for sending outgoing detection light to the scale, and with a light-receiving element for receiving a detection light component reflected by the reflecting surfaces of the scale.

Furthermore, the cylindrical housing may be a configuration provided with a cylindrical barrel part on which the circular outer surface is formed, a first end plate that seals one end of the cylindrical barrel part, and a second end plate that seals the other end of the cylindrical barrel part. In this case, a configuration may be adopted in which the fixed spindle is formed integrally with the first end plate, and the revolving output shaft is disposed to pass through a through-hole formed in the second end plate, and the revolving output shaft is rotatably supported by a bearing attached to the inner face of the through-hole.

In addition, the motor installed concentrically in the cylindrical housing may be configured so that it is provided with:
a cylindrical motor stator attached to the inner face of the cylindrical barrel part;
a cup-shaped motor rotor disposed concentrically so that a fixed gap is formed on an inner side of the motor stator, and provided with a cylindrical part and a disk that seals an end of the cylindrical part disposed on the first end plate side;
a motor shaft fixed concentrically to the central part of the disk on the motor rotor, the motor shaft passing through and extending beyond the disk; and
a magnetic detection element attached to the inside end surface of the second end plate in order to detect the magnetic pole position of the motor rotor;
wherein the end of the motor shaft on the first end plate side is rotatably supported by a bearing attached to the central part of the inside end surface of the first end plate.

Furthermore, the reducer installed concentrically on the inner side of the motor of this configuration may be a wave gear drive provided with a rigid internally toothed gear, a flexible externally toothed gear, and a wave generator. Each constituent part of such a wave gear drive may be configured as follows.

The rigid internally toothed gear is provided with a cylindrical portion formed integrally with the second end plate, and the cylindrical portion is disposed concentrically on the inner side of the cylindrical part of the motor rotor, the tip thereof extending to a position near the disc of the motor rotor, and internal teeth being formed on the inner face portion of the tip;

the flexible externally toothed gear is a cup-shaped part provided with a flexible cylindrical portion capable of flexing in a radial direction, a diaphragm that seals one end of the flexible cylindrical portion, a boss formed in the central portion of the diaphragm, and external teeth formed on the outer face portion of the open end of the flexible cylindrical portion, the boss being disposed concentrically so as to face the second end-plate side on the inner side of the rigid internally toothed gear, the boss being linked concentrically to the revolving output shaft, and the external teeth facing the internal teeth;

the wave generator is provided with an elliptically contoured rigid cam plate formed concentrically with a shaft portion that projects inward from the disk on the motor shaft, and a wave bearing mounted on the outer face of the rigid cam plate, the open end portion provided with the external teeth on the flexible cylindrical portion of the flexible externally toothed gear being flexed into an ellipsoid shape by the wave generator and engaging with the internal teeth on both ends in the direction of the major axis of the ellipsoid shape; and the end of the motor shaft on the inner side is rotatably supported by a bearing attached concentrically to the boss on the flexible externally toothed gear.

Furthermore, the rotary actuator equipped with a sensing mechanism according to the present invention may be linked in tandem to form a multistage actuator used for the finger of a robot hand or the like. The rotary actuator equipped with a sensing mechanism according to the present invention used for this purpose is characterized in that a housing-side linking part is formed on the circular outer face of the cylindrical housing, an arm-side linking part is formed on the outer face of the facing section of the rotary arm, and the housing-side linking part and the arm-side linking part are configured to be capable of linking with each other from the radial direction of the circular outer face of the cylindrical housing.

Effect of the Invention

In the rotary actuator equipped with a sensing mechanism according to the present invention, a motor and a reducer are concentrically disposed in a cylindrical housing, a scale for detecting the rotational position of a rotary arm is disposed on the circular outer face of the cylindrical housing, and a position sensor is mounted in a facing section of the rotary arm that rotates along the circular outer face, the facing section being in a facing arrangement with the circular outer face. Namely, the reducer, the motor, the cylindrical housing, the scale formed on the circular outer face of the cylindrical housing, and the position sensor mounted in the facing section of the rotary arm in a facing arrangement with the circular outer face are disposed concentrically in the indicated order from the inner side to the outer side about the central axis of the rotary actuator. Therefore, it is possible to obtain a compactly configured rotary actuator equipped with a sensing mechanism and designed with a short axial length.

Furthermore, the sensing mechanism is configured from a scale formed on the circular outer face of the cylindrical housing, and a position sensor mounted in a facing section that rotates along the circular outer face in the rotary arm. The circular outer face of the cylindrical housing and the interior of the facing section of the rotary arm, which are constituent parts of the rotary actuator, are used as a space for mounting the scale and the position sensor. Therefore, there is no need to add dedicated mounting space in the axial or radial direction of the rotary actuator. Accordingly, there is no increase in the axial length or diameter of the rotary actuator in order to mount the sensing mechanism, allowing achievement of a small-sized, compact rotary actuator equipped with a sensing mechanism.

MODE FOR CARRYING OUT THE INVENTION

Below, embodiments of the rotary actuator equipped with a sensing mechanism according to the present invention are explained with reference to drawings.

Figure 1:
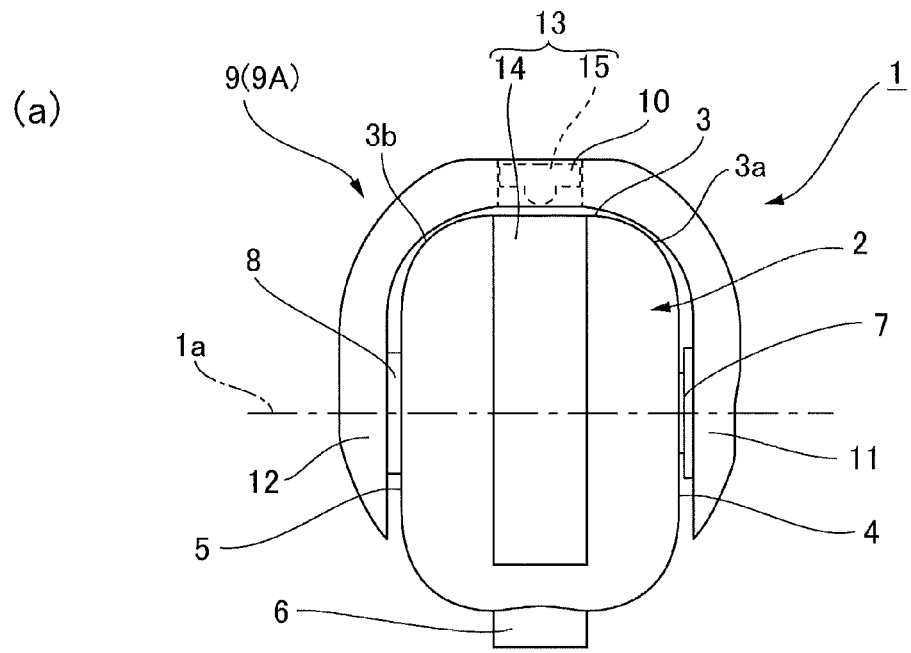
FIG. 1(*a*) and FIG. 1(*b*) are a front view and a side view showing the rotary actuator equipped with a sensing mechanism according to an embodiment of the present invention.
Figure 1:
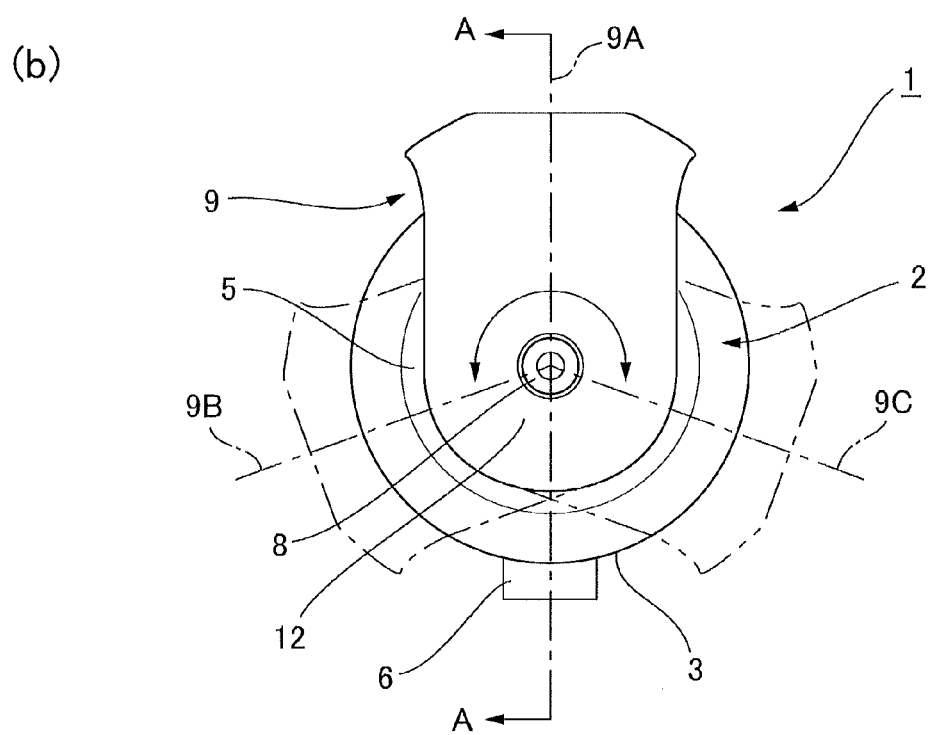

FIG. 1 is a front view and a side view showing the rotary actuator equipped with a sensing mechanism according to the present embodiment. The rotary actuator 1 equipped with a sensing mechanism (hereafter, may also be referred to simply as "rotary actuator 1") is provided with a cylindrical housing 2 in which constituent parts are installed. The cylindrical housing 2 is provided with a circular outer face 3 of a fixed width, and a circular first outside end surface 4 and a circular second outside end surface 5 located on both sides in the direction of the central axis 1*a* of the cylindrical housing 2, the circular outer face 3 and the first and second outside end surfaces 4 and 5 being smoothly connected by arc surfaces 3*a* and 3*b*, respectively.

A cylindrical attachment flange 6 projects from the circular outer face 3 of the cylindrical housing 2 in a radial direction, allowing attachment of the rotary actuator 1 in a designated area. Also, a fixed spindle 7 and a revolving output shaft 8 project outward concentrically with the central axis 1*a* from the first outside end surface 4 and the second outside end surface 5, respectively, on both sides. A rotary arm 9 spans between the fixed spindle 7 and the revolving output shaft 8.

The rotary arm 9 is a U-shaped arm that follows the outer face of the cylindrical housing 2, and the center portion of the arm is a facing section 10 in a facing arrangement with the circular outer face 3 of the cylindrical housing 2 at a fixed gap. One arm end 11 of the rotary arm 9 is rotatably attached to the fixed spindle 7 via a bearing 19 (see FIG. 2), and the other arm end 12 is fixedly linked to the revolving output shaft 8. When the revolving output shaft 8 revolves, the rotary arm 9 rotates within a finite angular range along the circular outer face 3 of the cylindrical housing 2 about the central axis 1*a*. In this example, an angular position of 180° from the attachment flange 6 (the position facing upward in FIG. 2) is the neutral position 9A, around which the rotary arm can rotate forward and backward within an angular range of less than 180°; for example, within the range from position 9B to 9C.

The rotational position of the rotary arm 9 (the revolving position of the revolving output shaft 8) can be detected by an optical rotary encoder 13. The optical rotary encoder 13 is provided with a scale plate 14 affixed to the circular outer face 3 of the cylindrical housing 2, and a position sensor 15 mounted in the facing section 10 of the rotary arm 9. The scale plate 14 is a plate of fixed width affixed across an angular range containing the rotation angular range of the rotary arm 9, and gradations comprising light-reflecting surfaces are formed on the surface of the plate at fixed intervals along the circumferential direction. The position sensor 15 is a reflective photosensor provided with a light-emitting element for sending outgoing detection light to the surface of the scale plate 14, and a light-receiving element for receiving a detection light component reflected by the light-reflecting surface.

Figure 2:
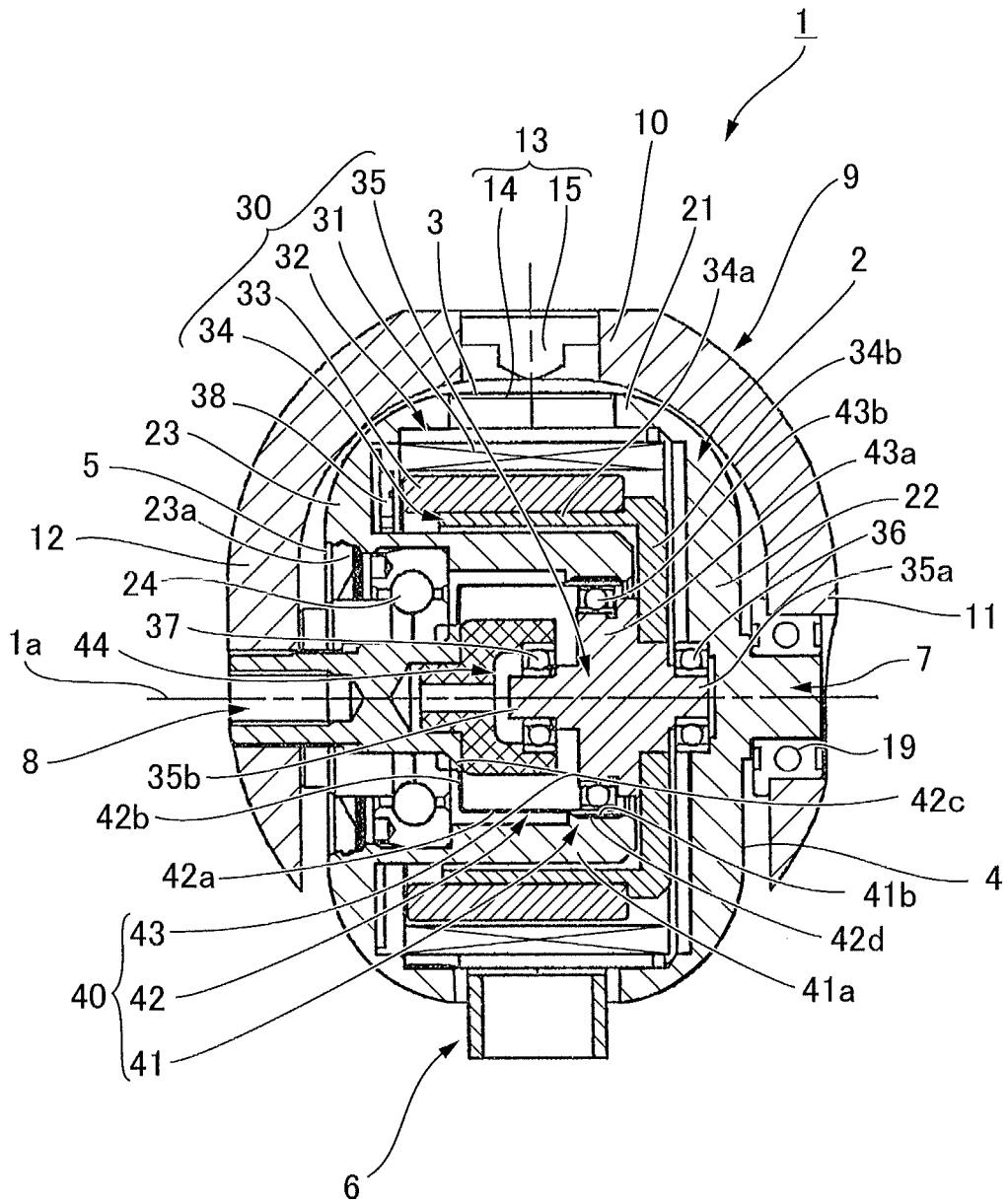
FIG. 2 is a longitudinal sectional view when the rotary actuator equipped with a sensing mechanism is cut on line A-A in FIG. 1(*b*)

Next, FIG. 2 is a longitudinal sectional view of the rotary actuator 1 when cut on line A-A of FIG. 1(b). The interior structure of the rotary actuator 1 is explained with reference to FIG. 2. First, the cylindrical housing 2 is provided with a cylindrical barrel part 21 on which the circular outer face 3 is formed, a first end part 22 that seals one end of the cylindrical barrel part 21 in the direction of the central axis 1a, and a second end part 23 that seals the other end. A fixed spindle 7 is integrally formed at the center of the first end part 22. A through-hole 23a is formed at the center of the second end part 23, a bearing 24 is attached to the inner face of the through-hole, and the revolving output shaft 8 is rotatably supported by the bearing 24.

A motor 30 and a wave gear drive 40 are concentrically installed inside the cylindrical housing 2. The motor 30 is provided with a cylindrical motor stator 32 wrapped in a stator coil 31; and a motor rotor 34, to which a rotor magnet 33 is attached, is disposed concentrically at a fixed gap on the inner side of the motor stator. The motor stator 32 is attached to the inner face of the cylindrical barrel part 21 of the cylindrical housing 2. The motor rotor 34 is a cup-shaped part provided with a cylindrical part 34a and a disk 34b extending inward from the end of the cylindrical part 34a at the first end plate 22, the rotor magnet 33 being attached to the cylindrical part 34a. A motor shaft 35 is fixed concentrically to the center of the motor rotor disk 34b.

The motor shaft 35 passes through the disk 34b, protruding on both sides. The shaft end 35a of the motor shaft 35 projecting at the first end plate 22 is rotatably supported by a bearing 36 attached at the middle of the inside end surface of the first end plate 22. The shaft end 35b projecting from the opposite side of the motor shaft 35 is rotatably supported by a bearing 37 attached to the wave gear drive 40 on the side located toward the member for outputting slower revolutions, as described below.

A magnetic detection element for detecting the motor magnet position, for example, a Hall element 38, is attached in the area on the outer side of the inside end surface of the second end plate 23 in a facing arrangement with the rotor magnet 33 of the motor rotor 34. The motor 30 is, for example, a three-phase motor, and a signal showing the position of each of the WW phases of the motor is generated on the basis of the detection signal obtained from the Hall element 38.

A wave gear drive 40 is concentrically installed on the inner side of the cylindrical part 34a of the motor rotor 34 of the motor 30. The wave gear drive 40 is provided with a rigid internally toothed gear 41, a cup-shaped flexible externally toothed gear 42, and an elliptically contoured wave generator 43. The rigid internally toothed gear 41 is provided with a cylindrical portion 41a formed integrally with the second end plate 23, and the cylindrical portion 41a is disposed concentrically on the inner side of the cylindrical part 34a of the motor rotor 34. The tip of the cylindrical portion 41a extends to a position near the disk 34b of the motor rotor 34, and internal teeth 41b are formed on the inner face portion of the tip.

The cup-shaped flexible externally toothed gear 42 is provided with a flexible cylindrical portion 42a that can be flexed in a radial direction, a diaphragm 42b that seals one end of the flexible cylindrical portion 42a, a boss 42c formed on the center portion of the diaphragm 42b, and external teeth 42d formed on the outer face portion of the open end of the flexible cylindrical portion 42a. In the flexible externally toothed gear 42, the boss 42c is disposed concentrically facing the second end plate 23 on the inner side of the cylindrical portion 41a of the rigid internally toothed gear 41, and the external teeth 42d face the internal teeth 41b. In this example, the revolving output shaft 8 is formed integrally with the boss 42c.

The wave generator 43 is provided with an elliptically contoured rigid cam plate 43a and a wave bearing 43b furnished on the outer face of the cam plate. The rigid cam plate 43a is integrally formed concentrically with the shaft portion projecting on the inner side from the disk 34b of the motor rotor 34 on the motor shaft 35. The open end portion on which the external teeth 42d of the flexible externally toothed gear 42 are formed is flexed in an ellipsoid shape by the wave generator 43, engaging with the internal teeth 41b at both ends of the ellipsoid shape in the direction of the major axis.

The cup-shaped bearing-support member 44 that opens to the motor shaft 35 is concentrically fixed to the boss 42c on the inner side of the flexible externally toothed gear 42. The shaft end 35b on the inner side of the motor shaft 35 is rotatably supported by the bearing 37 attached to the bearing-support member 44.

Here will be explained the action of the rotary actuator 1 in this configuration. When the motor 30 is driven and the motor shaft 35 is caused to revolve, the wave generator 43 of the wave gear drive 40 that is linked to the motor shaft 35 revolves in an integral manner. This causes the meshing position of the flexible externally toothed gear 42 and the rigid internally toothed gear 41 to move in a circumferential direction (to revolve). The flexible externally toothed gear 42 has 2n (where n is a positive integer), usually two, fewer teeth than does the rigid internally toothed gear 41. Therefore, the movement of the meshing position causes relative revolution that corresponds to the difference in the number of teeth to occur between the gears 41 and 42. The rigid internally toothed gear 41 is the fixed side, and the flexible externally toothed gear 42 therefore revolves at reduced speed. Namely, the revolving output shaft 8, which is linked to the flexible externally toothed gear, revolves, causing the rotary arm 9 linked to the revolving output shaft to rotate along the circular outer face 3 of the cylindrical housing 2.

The rotational position of the rotary arm 9 is detected by the optical rotary encoder 13. A motor drive control device (not shown) controls driving of the motor 30 on the basis of the rotational position of the rotary arm 9 and the magnetic pole position of the motor 30, allowing the rotary arm 9 to be positioned in a target position. A scale affixed to the circular outer face 3 of the cylindrical housing 2 is used in this example. Namely, compared with a case where the scale is located in another portion, the scale is located in a portion having the largest rotation radius of the rotary arm 9. Therefore, it is possible to increase the resolution of the sensing mechanism.

Application Example

The rotary actuator 1 of this example can be used as a robot joint unit; for example, the elbow joint unit of a robot arm, a wrist joint unit, a finger joint unit of a robot hand, or the like. In this case, in order to constitute a multi-joint finger, it is desirable to link a finger joint unit comprising the rotary actuator of this example in tandem to obtain a multistage arrangement.

Figure 3:
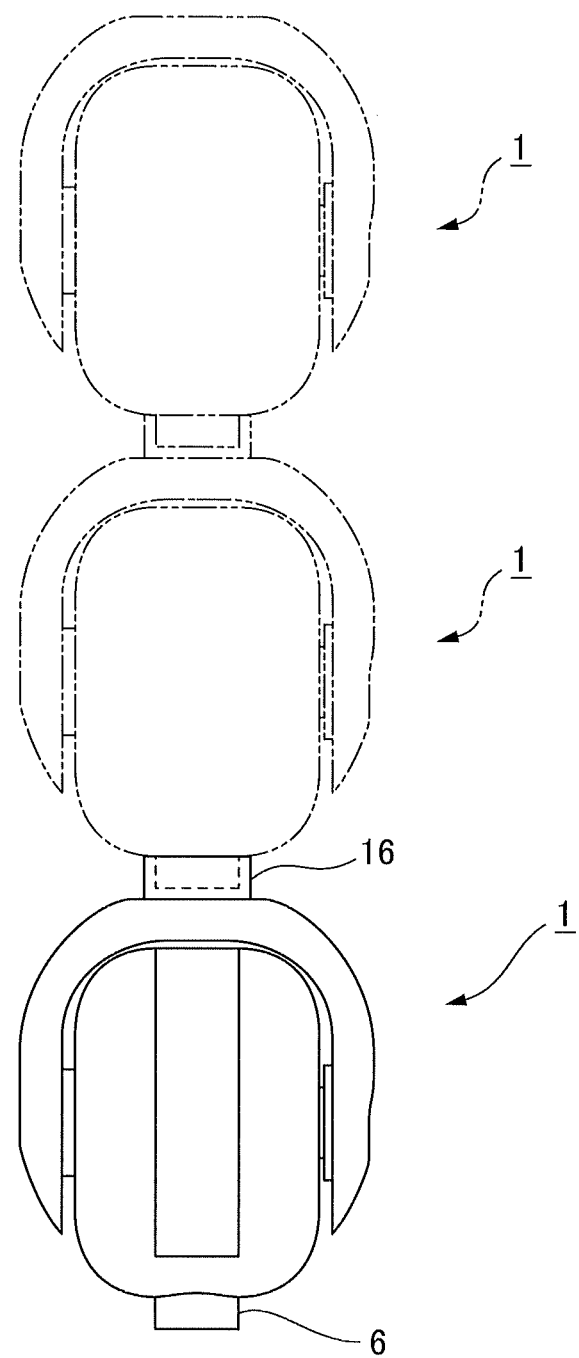
FIG. 3 is an explanatory diagram showing the rotary actuator equipped with a sensing mechanism and linked in multiple stages.

For this purpose, for example, the attachment flange 6 (housing-side link part) is disposed on the circular outer face 3 of the cylindrical housing 2 of the rotary actuator 1, and the arm-side link part 16 is attached to the outer face of the facing section 10 of the rotary arm 9, as shown in FIG. 3. This allows a structure in which the arm-side link part 16 can be linked to the attachment flange 6 (housing-side link part). In this manner, a configuration is possible in which the rotary actuator 1 is linked in multiple stages to constitute a multi-joint unit, as shown by the imaginary lines in FIG. 3.

EXPLANATION OF SYMBOLS

1 Rotary actuator equipped with sensing mechanism
2 Cylindrical housing
3 Circular outer face
4 First outer end surface
5 Second outer end surface
6 Attachment flange
7 Fixed spindle
8 Revolving output shaft
9 Rotary arm
9A Neutral position
9B, 9C Rotary positions
10 Facing section
11 First arm end
12 Second arm end
13 Optical rotary encoder
14 Scale
15 Position sensor
16 Arm-side link part
19 Bearing
21 Cylindrical barrel part
22 First end plate
23 Second end plate
14 Bearing
30 Motor
31 Stator coils
32 Motor stator
33 Rotor magnet
34a Cylindrical part
34b Disc part
35 Motor shaft
35a, 35b Shaft ends
36, 37 Bearings
38 Hall elements
40 Wave gear drive
41 Rigid internally toothed gear
41a Cylindrical part
41b internal teeth
42 Flexible externally toothed gear
42a Flexible cylindrical barrel part
42b Diaphragm
42c Boss
42d External teeth
43 Wave generator
43a Cam plate
43b Wave bearing
44 Bearing-support member

The invention claimed is:

1. A rotary actuator with a sensing mechanism comprising:
a cylindrical housing;
a fixed spindle and a revolving output shaft projecting concentrically outward from both end surfaces of the cylindrical housing, respectively;
a rotary arm provided with a facing section that spans between the fixed spindle and the revolving output shaft and is positioned facing a circular outer face of the cylindrical housing, the rotary arm being capable of rotating within a finite angular range on the circular outer face;
a scale formed along a circular outer direction on the circular outer face for detecting a rotational position of the rotary arm;
a position sensor mounted on the facing section of the rotary arm for reading the scale; a motor installed concentrically in the cylindrical housing; and
a reducer installed concentrically on an inner side of the motor in the cylindrical housing for reducing a speed of an output revolution of the motor and for outputting a revolution to the revolving output shaft;
wherein one end of the rotary arm is rotatably supported by the fixed spindle, and the other end is linked to the revolving output shaft.

2. The rotary actuator with a sensing mechanism according to claim 1, wherein
the scale has light-reflecting surfaces formed at a designated interval along the circular outer direction,
the position sensor is a reflecting photosensor having a light-emitting element for sending outgoing detection light to the scale and a light-receiving element for receiving a detection light component reflected by the reflecting surfaces of the scale.

3. The rotary actuator with a sensing mechanism according to claim 1, wherein
the cylindrical housing has a cylindrical barrel part on which the circular outer surface is formed, a first end plate that seals one end of the cylindrical barrel part, and a second end plate that seals the other end of the cylindrical barrel part,
the fixed spindle is formed integrally with the first end plate,
the revolving output shaft is disposed to pass through a through-hole formed in the second end plate, and
the revolving output shaft is rotatably supported by a bearing attached to an inner face of the through-hole.

4. The rotary actuator with a sensing mechanism according to claim 3, wherein the motor has:
a cylindrical motor stator attached to an inner face of the cylindrical barrel part;
a cup-shaped motor rotor disposed concentrically so that a fixed gap is formed on an inner side of the motor stator, and provided with a cylindrical part and a disk that seals an end of the cylindrical part disposed on the first end plate side;
a motor shaft fixed concentrically to a central part of the disk on the motor rotor and passing through the disk; and
a magnetic detection element attached to an inside end surface of the second end plate for detecting a magnetic pole position of the motor rotor;
wherein an end of the motor shaft on the first end plate side is rotatably supported by a bearing attached to a central part of an inside end surface of the first end plate.

5. The rotary actuator with a sensing mechanism according to claim 4, wherein the reducer is a wave gear drive having a rigid internally toothed gear, a flexible externally toothed gear, and a wave generator;

the rigid internally toothed gear has a cylindrical portion formed integrally with the second end plate, the cylindrical portion is disposed concentrically on an inner side of the cylindrical part of the motor rotor, a tip of the cylindrical portion extends to a position near the disc of the motor rotor, and internal teeth are formed on an inner face portion of the tip;

the flexible externally toothed gear is a cup-shaped part having a flexible cylindrical portion capable of flexing in a radial direction, a diaphragm that seals one end of the flexible cylindrical portion, a boss formed in a central portion of the diaphragm, and external teeth formed on an outer face portion of an open end of the flexible cylindrical portion, wherein the boss is disposed concentrically so as to face the second end-plate side on an inner side of the rigid internally toothed gear, the boss is linked concentrically to the revolving output shaft, and the external teeth face the internal teeth;

the wave generator has an elliptically contoured rigid cam plate formed concentrically with a shaft portion that projects inward from the disk on the motor shaft, and a wave bearing mounted on an outer face of the rigid cam plate, wherein an open end portion formed with the external teeth of the flexible cylindrical portion of the flexible externally toothed gear is flexed into an ellipsoid shape by the wave generator and the external teeth engage with the internal teeth on both ends in the direction of a major axis of the ellipsoid shape; and an inner-side end of the motor shaft is rotatably supported by a bearing attached concentrically to the boss of the flexible externally toothed gear.

6. The rotary actuator with a sensing mechanism according to claim 1, further comprising:
   a housing-side linking part formed on a circular outer face of the cylindrical housing,
   an arm-side linking part formed on an outer face of the facing section of the rotary arm, and
   the housing-side linking part and the arm-side linking part being configured to be capable of linking with each other from a radial direction of the circular outer face of the cylindrical housing.

7. A joint unit of a robot wherein the joint unit comprises a rotary actuator with a sensing mechanism according to claim 1.

8. The rotary actuator with a sensing mechanism according to claim 2, further comprising:
   a housing-side linking part formed on a circular outer face of the cylindrical housing,
   an arm-side linking part formed on an outer face of the facing section of the rotary arm, and
   the housing-side linking part and the arm-side linking part being configured to be capable of linking with each other from a radial direction of the circular outer face of the cylindrical housing.

9. A joint unit of a robot wherein the joint unit comprises a rotary actuator with a sensing mechanism according to claim 2.

10. The rotary actuator with a sensing mechanism according to claim 3, further comprising:
    a housing-side linking part formed on a circular outer face of the cylindrical housing,
    an arm-side linking part formed on an outer face of the facing section of the rotary arm, and
    the housing-side linking part and the arm-side linking part being configured to be capable of linking with each other from a radial direction of the circular outer face of the cylindrical housing.

11. A joint unit of a robot wherein the joint unit comprises a rotary actuator with a sensing mechanism according to claim 3.

12. The rotary actuator with a sensing mechanism according to claim 4, further comprising:
    a housing-side linking part formed on a circular outer face of the cylindrical housing,
    an arm-side linking part formed on an outer face of the facing section of the rotary arm, and
    the housing-side linking part and the arm-side linking part being configured to be capable of linking with each other from a radial direction of the circular outer face of the cylindrical housing.

13. A joint unit of a robot wherein the joint unit comprises a rotary actuator with a sensing mechanism according to claim 4.

14. The rotary actuator with a sensing mechanism according to claim 5, further comprising:
    a housing-side linking part formed on a circular outer face of the cylindrical housing,
    an arm-side linking part formed on an outer face of the facing section of the rotary arm, and
    the housing-side linking part and the arm-side linking part being configured to be capable of linking with each other from a radial direction of the circular outer face of the cylindrical housing.

15. A joint unit of a robot wherein the joint unit comprises a rotary actuator with a sensing mechanism according to claim 5.

16. A joint unit of a robot wherein the joint unit comprises a rotary actuator with a sensing mechanism according to claim 6.

17. A joint unit of a robot wherein the joint unit comprises a rotary actuator with a sensing mechanism according to claim 14.

* * * * *